(12) United States Patent
Beer

(10) Patent No.: US 8,726,752 B2
(45) Date of Patent: May 20, 2014

(54) SHIFT SECURING DEVICE FOR A MULTI-SPEED MANUAL GEARBOX

(75) Inventor: Uwe Beer, Potsdam (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 38 days.

(21) Appl. No.: 13/574,325

(22) PCT Filed: Dec. 14, 2010

(86) PCT No.: PCT/EP2010/069611
§ 371 (c)(1),
(2), (4) Date: Jul. 20, 2012

(87) PCT Pub. No.: WO2011/091907
PCT Pub. Date: Aug. 4, 2011

(65) Prior Publication Data
US 2012/0304794 A1 Dec. 6, 2012

(30) Foreign Application Priority Data
Jan. 28, 2010 (DE) .......................... 10 2010 001 295

(51) Int. Cl.
*B60K 20/00* (2006.01)
*F16H 59/04* (2006.01)

(52) U.S. Cl.
USPC .......................... 74/335; 74/473.3; 74/473.36

(58) Field of Classification Search
USPC ............ 74/335, 473.1, 473.3, 473.36, 473.37
See application file for complete search history.

(56) References Cited

U.S. PATENT DOCUMENTS

| | | | |
|---|---|---|---|
| 3,444,752 A | 5/1969 | Fischer et al. | |
| 3,527,116 A | 9/1970 | Kimberlin | |
| 4,817,468 A * | 4/1989 | Leigh-Monstevens et al. | 74/335 |
| 5,085,095 A * | 2/1992 | Lasoen | 74/473.3 |
| 5,297,453 A * | 3/1994 | Chene | 74/473.24 |
| 5,309,785 A * | 5/1994 | Knape | 74/473.24 |
| 5,544,541 A * | 8/1996 | Kruizenga et al. | 74/473.24 |
| 5,743,147 A * | 4/1998 | Gazyakan | 74/473.25 |
| 5,996,436 A | 12/1999 | Dreier et al. | |
| 6,877,390 B2 * | 4/2005 | Tsuzuki et al. | 74/335 |

FOREIGN PATENT DOCUMENTS

| | | |
|---|---|---|
| DE | 21 32 736 A1 | 1/1973 |
| DE | 30 03 076 A1 | 7/1980 |
| DE | 37 30 230 C1 | 3/1989 |
| DE | 40 17 957 A1 | 12/1990 |
| DE | 41 18 931 A1 | 12/1992 |
| DE | 197 05 557 A1 | 9/1997 |

(Continued)

*Primary Examiner* — Ha D Ho
(74) *Attorney, Agent, or Firm* — David & Bujold, PLLC; Michael J. Bujold

(57) ABSTRACT

A shift securing device of a manual gearbox that is shifted by a selector shaft disposed axially parallel to the gearbox shafts. The selector shaft slides axially and rotates about the longitudinal axis of the selector shaft and can be selectively coupled to a shift fork guided on a shift rail and/or rocker. An axially fixed and rotatable locking body supports locking elements for form-locking the uncoupled shift rail and/or rocker. The locking body is a box frame having two transverse and two longitudinal members. The transverse members have bearing holes in which the selector shaft is accommodated in an axially movable manner. The locking body is rotationally fixed to the selector shaft by a carrier that engages in one of the longitudinal members in a form-locking manner. The locking body is fixed to the housing by an axial bearing disposed on a transverse member.

8 Claims, 3 Drawing Sheets

(56) References Cited

FOREIGN PATENT DOCUMENTS

| | | |
|---|---|---|
| DE | 196 53 172 A1 | 6/1998 |
| DE | 199 01 055 A1 | 8/1999 |
| DE | 199 14 198 A1 | 10/1999 |
| DE | 10 2007 042 805 A1 | 3/2009 |
| WO | 2009/033932 A3 | 3/2009 |

* cited by examiner

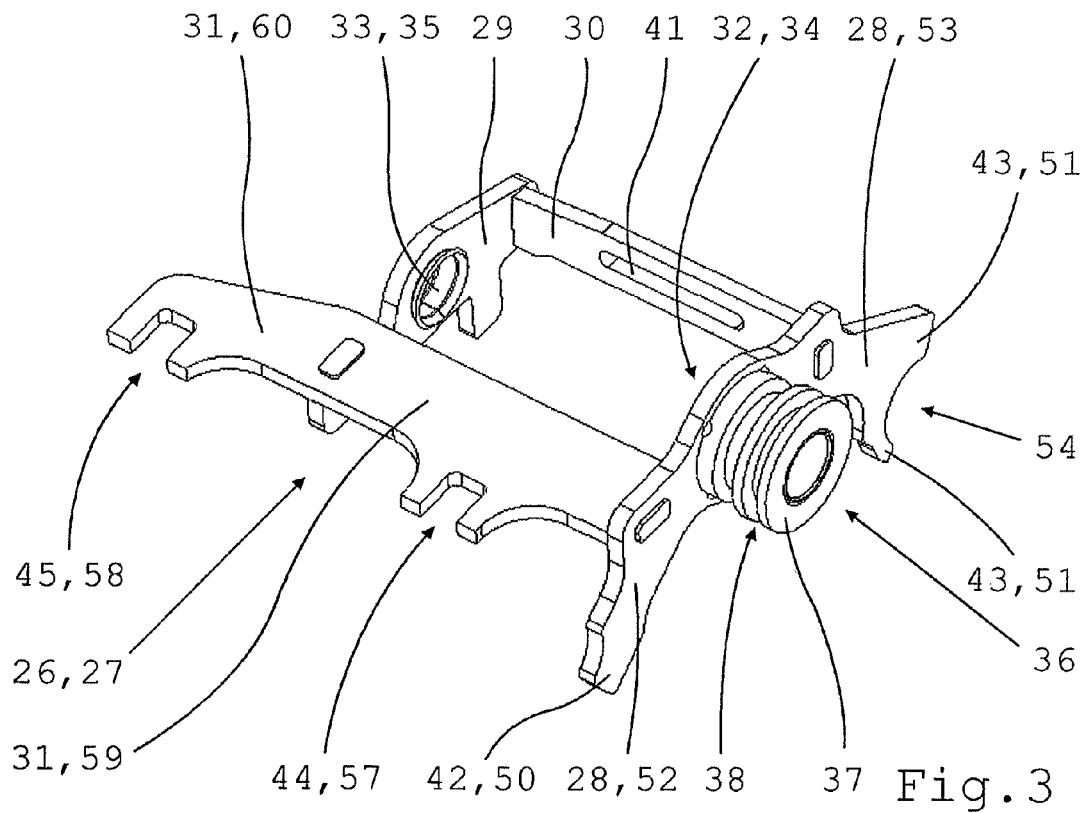
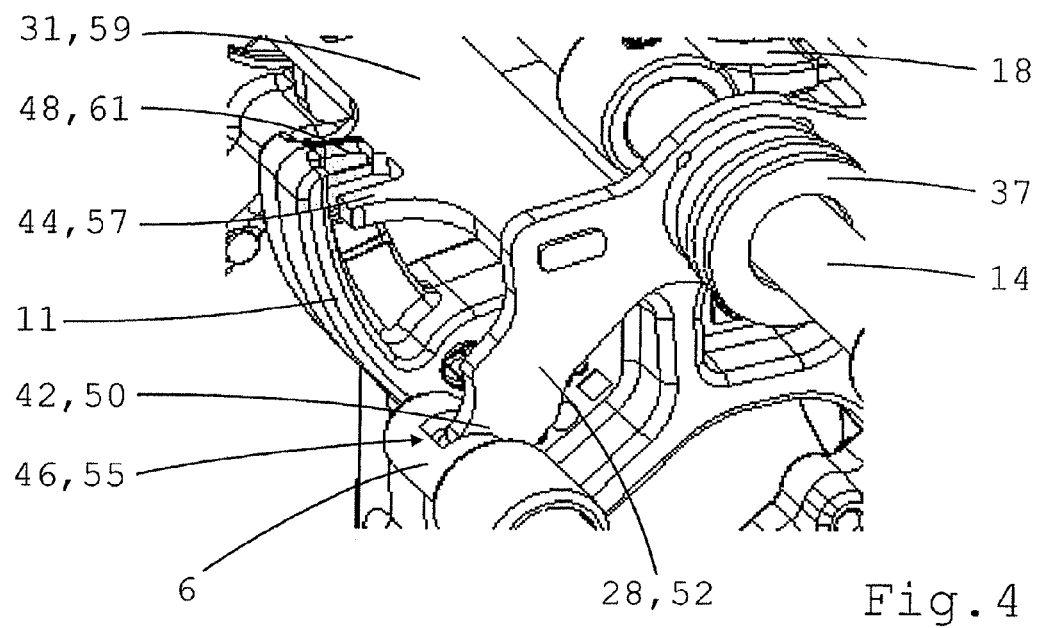

SHIFT SECURING DEVICE FOR A MULTI-SPEED MANUAL GEARBOX

This application is a National Stage completion of PCT/EP2010/069611 filed Dec. 14, 2010, which claims priority from German patent application serial no. 10 2010 001 295.5 filed Jan. 28, 2010.

FIELD OF THE INVENTION

The invention relates to a shift securing device of multi-speed manual gearbox.

BACKGROUND OF THE INVENTION

Multi-speed manual gearboxes of motor vehicles commonly have a countershaft design and comprise at least two axially parallel gearbox shafts, which can be brought into a driving connection with each other selectively by means of several gear steps having different gear ratios. For a manual gearbox designed to be installed longitudinally in a motor vehicle, the gearbox shafts in question are usually the countershaft, which has a driving connection to the input shaft via an input constant, and the output shaft. For a manual gearbox designed to be installed transversely in a motor vehicle, the gearbox shafts in question are usually formed by the input shaft and the output shaft. The gear steps are mostly designed as spur gear pairs that each comprise a fixed gear disposed on the one gearbox shaft in a rotationally fixed manner and a freewheeling gear rotatably supported on the other gearbox shaft.

To engage a gear step, i.e., to establish a driving connection between the two gearbox shafts having the gear ratio of the gear step in question, a gear coupling is associated with each freewheeling gear, by means of which gear coupling the freewheeling gear can be connected to the gearbox shaft in question in a rotationally fixed manner. For a manual gearbox designed for longitudinal installation, the output shaft is generally disposed coaxially adjacent to the input shaft and can be connected to the input shaft by means of a gear coupling, whereby an additional direct gear step is available. The freewheeling gears of axially adjacent spur gear pairs are preferably disposed on the same gearbox shaft at least in pairs so that the gear couplings can be combined in pairs into shifting groups each having a common selector sleeve.

For the transmission of selecting and shifting movements within the gearbox, a selector shaft disposed axially parallel to the gearbox shafts can be provided, as assumed here. The selector shaft is axially movable, is supported in the gearbox housing so as to be rotatable about the longitudinal axis of the selector shaft, and can be selectively coupled to several shift forks each guided on a shift rail and/or to several shift rockers by means of an associated selector finger. The shift forks and the shift rockers each engage in a form-locking manner with the selector sleeve of an associated shifting group and can axially move the selector sleeve in order to engage and disengage gear steps. The selector fingers are disposed on the selector shaft with axial offset and generally also with circumferential offset, and therefore only one of the selector fingers engages with a carrier of a shift rail or of a shift rocker when the selector shaft rotates, which corresponds to a selection procedure or the selection of a shift gate. As the result of a subsequent axial movement of the selector shaft, the previously coupled shift fork or shift rocker is axially moved or is pivoted about its rotational axis, whereby the associated selector sleeve is axially moved, which corresponds to a shifting procedure or the engagement and disengagement of one of the gears of the selected shift gate.

The shift rails or shift forks and the shift rockers are usually secured in a friction-locking manner by means of a spring locking mechanism in the positions corresponding to the neutral position and the shift positions of the associated selector sleeve. However, under unfavorable operating conditions, such as during driving on a poor road surface, during which sever shaking can occur, and during heavy braking maneuvers or fast cornering that causes high inertial forces, this can be insufficient to reliably prevent the simultaneous deflection of at least two shift elements (shift forks and/or shift rockers) from their neutral position. However, the basic prerequisite for the safe operation of the manual gearbox and in particular for the trouble-free performance of selection procedures and shifting procedures is that the shift elements that are not coupled to the shifting device remain in their neutral position. Therefore, many styles of shift locking devices or shift securing devices for multi-speed manual gearboxes have been proposed, by means of which the shift elements that are not coupled can be locked in their neutral position in a form-locking manner independently, i.e., without the aid of locking elements operated by means of external energy.

Shift securing devices for manual gearboxes having shift forks guided on shift rails are known from DE 21 32 736 A, DE 37 30 230 C1, and DE 196 53 172 A1, wherein during the axial movement of one of the shift rails due to shifting, one or more locking elements that can move transversely to the shift rails are pressed into a respective locking groove of the other shift rails by a control bevel of the axially moved shift rail and these other shift rails are thus locked in their neutral position. In the shift securing device according to DE 21 32 736 A, the locking elements are designed as locking pins or locking balls disposed in transverse holes in the housing. The shift securing device according to DE 37 30 230 C1 comprises a single locking element designed as a locking plate, which is disposed perpendicular to the shift rails and engages by means of the recesses associated with edges in a respective annular groove of the shift rails not coupled. In the shift securing device according to DE 196 53 172 A1, the locking elements are designed as blocking panels that can be rotated about an axially parallel axis. These known shift securing devices require little packaging space, but they require high precision in the manufacture of the components in question and are difficult to assemble.

In DE 40 17 957 A1, a shift securing device for manual gearboxes having shift rockers is described, wherein the locking elements, which each act between two shift rockers, are designed as rocker arms supported on the housing. When one of the shift rockers rotates as a result of a shift, the other shift rocker is locked in its neutral position by the engagement of a locking cam of the rocker arm, which is partially pivoted along, in a locking groove. In order to couple two axially adjacent rocker arms, an arrangement of the locking cams and the locking grooves in the opposite direction on the middle shift rocker and a push rod that connects the two rocker arms in an articulated manner are provided. However, this known shift securing device requires a large installation space and is relatively complex to assemble.

Because manual gearboxes can comprise both shift forks guided on shift rails as well as shift rockers as shift elements, in particular in order to achieve compact dimensions, special shift securing devices in which the two styles of shift elements are combined are required for this purpose. Thus in DE 41 18 931 A1 a shift securing device for a manual gearbox having two shift forks guided on shift rails and two shift rockers is described, wherein a locking element of the shift rails designed as a ball or as a blocking plate and a locking element of the shift rockers designed as a rocker arm are operatively connected to each other by means of a push lever connected to the rocker arm in an articulated manner and a swiveling lever supported on the housing.

All previously mentioned shift securing devices have the functional disadvantage that the shift elements (shift forks and/or shift rockers) that are not coupled are not secured in a form-locking manner until the coupled shift element moves or pivots from its neutral position.

By contrast, for manual gearboxes having shift forks guided on the selector shaft in an axially movable manner, shift securing devices are known for which the shift forks that are not coupled are already secured in a form-locking manner at the time of the selection procedure, i.e., the coupling of one of the shift forks by rotation of the selector shaft. Thus a shift securing apparatus having a locking body that is locked to the housing in the axial direction and that can rotated with the selector shaft is known from DE 30 03 076 C2, the locking body being designed as a longitudinally slotted sleeve and being disposed on the selector shaft by means of the single selector finger. The single locking element is designed as a radially oriented blocking plate that is radially slotted in the region of the selector finger, that engages in a respective opening disposed on each shifting arm of the shift forks, and that is axially fixed relative to the gearbox housing by means of a slotted screw. Because of the longitudinal slot of the sleeve and the radial slot of the blocking plate, only the shift forks coupled by the engagement of the selector finger in the opening of the shifting arm in question can be axially moved with the selector shaft.

In a functionally similar shift securing device known from DE 199 01 055 A1, the locking body is designed as an elongated carrier plate guided radially between the selector shaft and the shift forks in longitudinal grooves of the shift forks, the carrier plate being axially fixed by means of a circumferential slot, in which a bolt fastened to the housing engages. The shift forks that are not coupled are locked in a form-closed manner by the engagement of locking pins disposed on the carrier plate in inner radial grooves of the shift forks, whereas the locking pins associated with the coupled shift fork lie in the region of axial openings of the radial groove in question. However, this style of manual gearbox having shift forks guided on the selector shaft in an axially movable manner is relatively rare and is not practical for achieving compact dimensions for manual gearboxes having more than three shift elements or shift gates.

SUMMARY OF THE INVENTION

Therefore, the problem to be solved by the invention is that of proposing a shift securing device of a multi-speed manual gearbox by means of which the functional principle of the two aforementioned shift securing devices is transferred, with the simplest and most space-saving design possible, to manual gearboxes that are provided with shift forks guided on shift rails, with shift rockers, or with a combination of both styles of shift elements.

The problem is solved in connection with the features that the locking body is designed as a box frame having at least two transverse members and two longitudinal members, the locking body having respective bearing holes disposed in the transverse members, in which bearing holes the selector shaft is accommodated in an axially movable manner, the locking body being connected to the selector shaft in a rotationally fixed manner by means of a carrier that engages circumferentially in one of the longitudinal members in a form-locking manner, and the locking body being locked rigidly to the housing by means of an axial bearing disposed on one of the transverse members.

Therefore, the invention proceeds from a multi-speed manual gearbox known per se and having a countershaft design, which multi-speed manual gearbox can be shifted by means of a selector shaft disposed axially parallel to the gearbox shafts. The selector shaft is axially movable, is supported in the gearbox housing so as to be rotatable about the longitudinal axis of the selector shaft, and can be selectively coupled by means of an associated selector finger to several shift elements, which can be designed as shift forks each guided on a shift rail and/or as several shift rockers. In order to lock the shift forks and/or shift rockers currently not coupled, a locking body that is rigidly locked to the housing in the axial direction and can rotate with the selector shaft is provided, on which locking body locking elements are arranged for the form-closed locking of the shift elements in question.

According to the invention, the locking body is designed as a box frame, which comprises at least two transverse members and two longitudinal members. In each of the transverse members, the box frame has bearing hole, in which the selector shaft is accommodated in an axially movable manner, wherein the box frame is locked to the housing by means of an axial bearing disposed on one of the transverse members and is connected to the selector shaft in a rotationally fixed manner by means of a carrier that engages circumferentially in one of the longitudinal members in a form-locking manner.

The box frame forms a very stable and at the same time light locking body, which is placed in a space-saving manner, because the locking body is disposed on the selector shaft, and which offers large lever arms for arranging the locking elements by means of the radial dimensions of the locking body. This results in small rotation angles of the selector shaft for coupling the particular selected shift element and of the engagement of the locking elements in the associated counter locking elements of the shift elements currently not coupled, and thus short selection paths between the shift gates. The locking elements of the locking body and the counter locking elements of the shift elements thus can be provided with a certain axial play to avoid jamming without impairing the shift securing function.

The box frame can be advantageously installed on the selector shaft already with the installation of the selector fingers before the selector shaft is inserted into the gearbox housing. To achieve compact dimensions of the manual gearbox, the locking body designed as a box frame is advantageously disposed on the selector shaft in the region of fixed gears of the adjacent gearbox shaft, because the fixed gears usually have a smaller diameter than the freewheeling gears disposed on the same gearbox shaft, and no shift forks or shift rockers are disposed in their immediate vicinity.

The transverse members and the longitudinal members of the locking body are preferably designed as pressed sheet metal parts and stamped sheet metal parts and rigidly connected to each other, which enables cost-effective production.

To connect the transverse members and the longitudinal members of the locking body, they can be welded to each other or inserted into each other at the ends and press fit to each other.

The axial bearing used to axially fix the locking body relative to the gearbox housing can be designed in a particularly simple and space-saving manner as a bearing sleeve that is fastened to a transverse member coaxially adjacent to the bearing hole and that has an outer annular groove, into which a rib fastened to the housing engages in the assembled state.

The rotationally rigid connection of the box frame to the selector shaft can be formed just as simply and compactly by the engagement of one of the selector fingers in an axial longitudinal slot, which is disposed in a largely tangentially oriented longitudinal member or in a largely tangentially oriented section of a longitudinal member.

In a style that is easy to manufacture, at least one of the locking elements provided for the shift forks is advantageously designed as a circumferentially-radially oriented locking rib and the associated counter locking element is advantageously designed as a circumferential radial groove disposed in the associated shift rail, in which circumferential radial groove the locking rib engages when the shift fork in question is not coupled.

At least one locking rib is preferably disposed on a cantilever of a transverse member protruding radially beyond the adjacent longitudinal member, because the least possible installation space is thus required for the pivoting range to be kept free.

In a style that is likewise easy to manufacture, at least one of the locking elements provided for the shift rockers is advantageously designed as an axially-radially oriented locking fork and the associated counter locking element is designed as a radial locking tooth that is disposed on the associated shift rocker and that is axially enclosed by the locking fork when the shift rocker in question is not coupled.

At least one locking fork is preferably disposed on a largely radially oriented longitudinal member or on a largely radially oriented section of a longitudinal member, because this is the functionally optimal orientation of the longitudinal member for the arrangement of the locking fork.

At least one locking fork can be disposed in a very stable central section of a longitudinal member lying between two transverse members or on a cantilever of a longitudinal member protruding axially beyond the adjacent transverse member.

BRIEF DESCRIPTION OF THE DRAWINGS

Drawings containing an example embodiment are enclosed with the description in order to illustrate the invention. In the drawings, FIG. 3 shows the locking body of the shift securing device according to FIG. 1 and FIG. 2 in a perspective individual-part view, and FIG. 4 shows a detailed view of the shift securing device in a magnified detail A from FIG. 2.

DETAILED DESCRIPTION OF THE PREFERRED EMBODIMENTS

Figure 1:
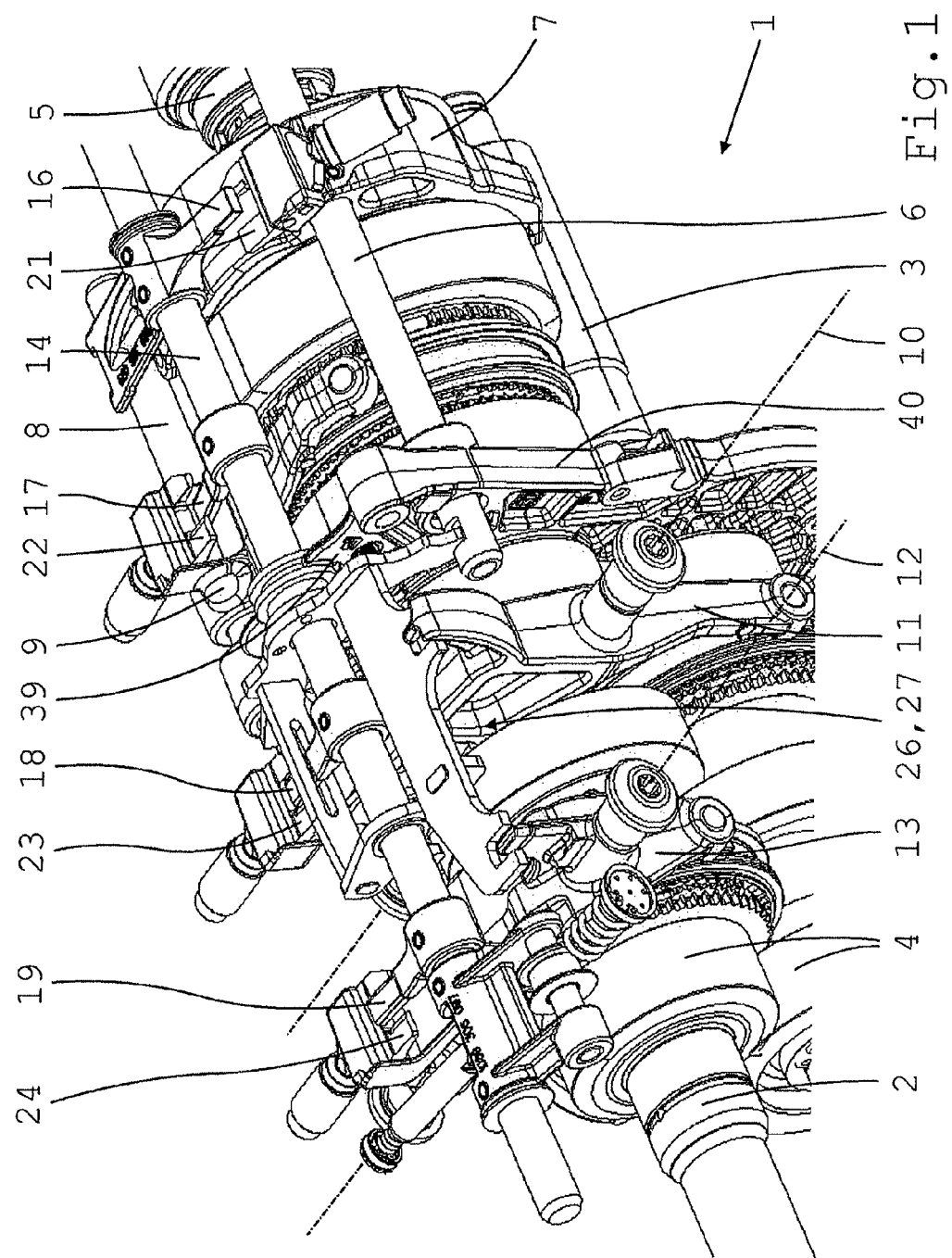
FIG. 1 shows a shifting device and a shift securing device of a manual gearbox according to the invention in a perspective view from the front at an angle.
Figure 2:
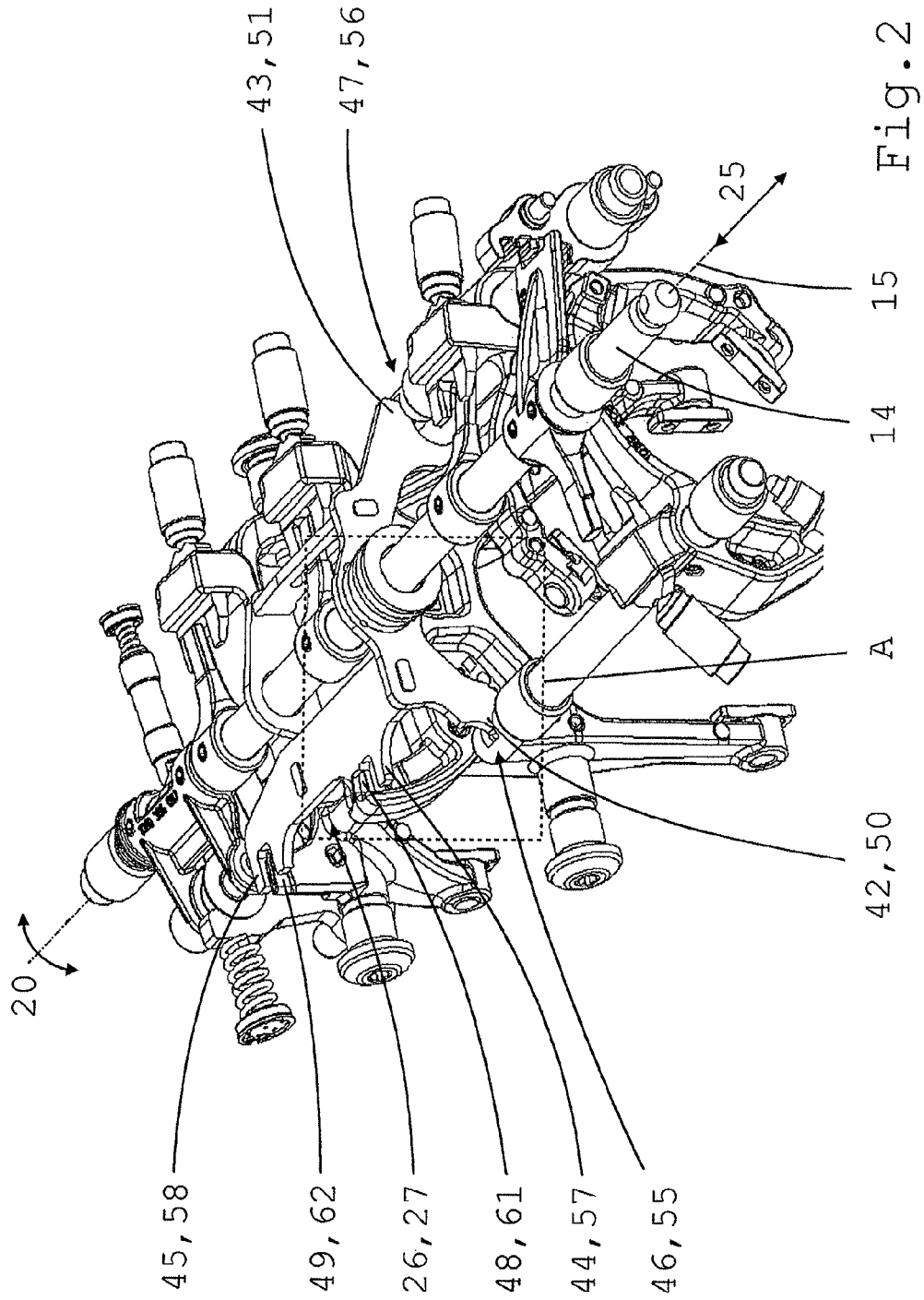
FIG. 2 shows the shifting device and the shift securing device of the manual gearbox according to FIG. 1 in a perspective view from the rear at an angle.

A manual gearbox 1, which has a countershaft design and is only partially illustrated in FIG. 1 and FIG. 2, comprises an input shaft 2, a countershaft 3, which is disposed axially parallel to the input shaft and which has a driving connection to the input shaft 2 by means of an input constant 4 designed as a spur gear pair, and an output shaft 5 disposed coaxially adjacent to the input shaft 2.

The manual gearbox 1 has a total of seven selectable gear steps, six forward gears G1 to G6 and a reverse gear R, of which six gear steps are formed by a respective spur gear set disposed between the countershaft 3 and the output shaft 5 and having a fixed gear and a freewheeling gear that can be connected to the respective gearbox shaft 3, 5 by means of a gear coupling and a high forward gear (G5 or G6) is designed as a direct gear that can be selected by directly connecting the input shaft 2 to the output shaft 5. The gear coupling of the reverse gear R is a component of a first shifting group as the only gear. A first shift fork 7 guided on a shift rail 6 in an axially movable manner engages with the selector sleeve of the first shifting group.

The gear couplings of the first and second forward gears G1, G2 are combined in a common second shifting group. A second shift fork 9 guided on a shift rail 8 in an axially movable manner engages with the selector sleeve of the second shifting group. The gear couplings of the third and fourth forward gears G3, G4 are combined in a common third shifting group. A first shift rocker 11 pivotably supported about a rotational axis 10 perpendicular to the gearbox shafts 3, 5 engages with the selector sleeve of the third shifting group. The gear couplings of the fifth and sixth forward gears G5, G6 are combined in a common fourth shifting group. A second shift rocker 13 pivotably supported about a rotational axis 12 perpendicular to the gearbox shafts 3, 5 engages with the selector sleeve of the fourth shifting group.

For the transmission of selecting and shifting movements within the gearbox, a selector shaft 14 is provided, which is disposed axially parallel to the gearbox shafts 3, 5 and adjacent to the output shaft 5, wherein the selector shaft 14 is supported in a gearbox housing, which is not presented in greater detail, so as to be axially movable and rotatable about the longitudinal axis 15 of the selector shaft.

Four selector fingers 16, 17, 18, 19 are disposed on the selector shaft 14 with axial and circumferential offset. The selector fingers can be selectively brought into engagement with one of the fork-shaped carriers 21, 22, 23, 24 of the four shift elements (shift forks 7, 9 and shift rockers 11, 13) by rotation 20 of the selector shaft 14 about the longitudinal axis 15 of the selector shaft, which corresponds to a selection procedure or the selection of a shift gate. As the result of a subsequent axial movement 25 of the selector shaft 14, the previously coupled shift fork 7, 9 or shift rocker 11, 13 is axially moved or is pivoted about its rotational axis 10, 12, whereby the associated selector sleeve is axially moved, which corresponds to a shifting procedure or the engagement and disengagement of one of the gears G1 to G6 or R of the selected shift gate.

A shift securing device according to the invention for form-locking the shift forks 7, 9 or shift rockers 11, 13 that are not coupled comprises a locking body 26, which is disposed on the selector shaft 14, is rigidly locked to the housing in the axial direction, and can rotate with the selector shaft 14. As can be seen especially in the individual-part view of FIG. 3, the locking body 26 is designed as a box frame 27, which comprises two transverse members 28, 29 and two longitudinal members 30, 31. These members 28, 29, 30, 31 are designed as pressed sheet metal parts and stamped sheet metal parts and inserted into each other at the ends and press fit to each other.

With respect to the selector shaft 14, the one longitudinal member 30 is oriented largely tangentially and the other longitudinal member 31 is oriented largely radially. The box frame 27 has respective bearing holes 32, 33 disposed in the transverse members 28, 29. Respective bearing bushings 34, 35 are inserted in the bearing holes. These bearing bushings 34, 35 are used to accommodate the selector shaft 14 in the box frame 27 of the locking body 26 in an axially movable manner.

The locking body 26 or the box frame 27 is rigidly locked to the housing in the axial direction by means of an axial bearing 36 without hindering rotation 20 of the locking body or box frame about the longitudinal axis 15. The axial bearing 36 is designed as a bearing sleeve 37 that is fastened to the one transverse member 28 coaxially adjacent to the bearing hole 32 and that has an outer annular groove 38, into which a rib 39 of an intermediate wall 40 fastened to the housing engages. Because of a rotationally rigid connection of the box frame 27 to the selector shaft 14 formed by the engagement of a selector finger 18 into an axial longitudinal slot 41 disposed in the longitudinal member 30, the locking body 26 is rotated together with the selector shaft 14 about the longitudinal axis 15 during a selection procedure.

With the form-locking coupling of one of the shift forks 7, 9 or the shift rockers 11, 13 to the selector shaft 14, which occurs by means of the engagement of one of the selector fingers 16, 17, 18, 19 in the carrier 21, 22, 23, 24 in question, locking elements 42, 43, 44, 45 disposed on the box frame 27 engage at the same time with associated counter locking elements 46, 47, 48, 49 of the shift elements 7, 9, 11, 13 that are not coupled, whereby the shift elements that are not coupled are secured in a form-locking manner against axial movement or pivoting.

The locking elements 42, 43 provided for the shift forks 7, 9 are each designed as a circumferentially-radially oriented locking rib 50, 51 that is disposed on a cantilever 52, 53 of the one transverse member 28 that protrudes radially beyond the adjacent longitudinal member 30, 31.

In the individual-part view of FIG. 3, it can be seen that the locking rib 51 associated with the shift fork 9 is interrupted by a recess 54 in order to enable the gears G1, G2 to be shifted in the coupled state of the shift fork 9.

The associated counter locking elements 46, 47 of the shift forks 7, 9 are each designed as a circumferential radial groove 55, 56 that is disposed in the associated shift rail 6,8 and in which the respective locking rib 50, 51 engages when the shift fork 7, 9 in question is not coupled.

The locking elements 44, 45 provided for the shift rockers 11, 13 are each designed as an axially-radially oriented locking fork 57, 58 that is disposed on the longitudinal member 31 in a central section 59 lying between the two transverse members 28, 29 or on a cantilever 60 protruding axially beyond the adjacent transverse member 29. The associated counter locking elements 48, 49 of the shift rockers 11, 13 are each designed as a radial locking tooth 61, 62 that is disposed directly on the shift rocker 11, 13 in question and that is axially enclosed by the respective locking fork 57, 58 when the shift rocker 11, 13 in question is not coupled.

The illustrations of FIGS. 1 and 2 show an operating state of the manual gearbox 1 in which the shift rocker 11 is coupled to the selector shaft 14 by means of the engagement of the selector finger 18 in the carrier 23 in question, i.e., the shift gate of the gears G3, G4 is selected. In this operating state, the other shift elements 7, 9, 13 are locked in their neutral position in a form-locking manner by means of the engagement of the respective locking element 42, 43, 45 of the locking body 26 in the corresponding counter locking element 46, 47, 49.

In detail A of FIG. 2 shown magnified in FIG. 4, it can be seen that the locking element 42, which is associated with the shift gate of the reverse gear R and which is disposed on the cantilever 52 of the transverse member 28 and which is designed as a circumferentially-radially oriented locking rib 50, engages in the counter locking element 46, which is disposed in the associated shift rail 6 and which is designed as a circumferential radial groove 55, whereby the associated shift fork 7 is locked in its neutral position.

It can also be seen in FIG. 4, in connection with FIG. 1, that the locking element 44, which is associated with the shift gate of the gears G3, G4 and which is disposed in the central section 59 on the longitudinal member 31 and which is designed as an axially-radially oriented locking fork 57, is not engaged with the counter locking element 48, which is disposed on the shift rocker 11 in question and which is designed as a radial locking tooth 61. Thus the shift rocker 11, which is coupled by means of the engagement of the selector finger 18 in the carrier 23, can be pivoted by means of an axial movement 25 of the selector shaft 14 and thus the gears G3, G4 can be shifted, i.e., engaged and disengaged.

The essential advantages of the presented shift securing device are the simple and space-saving design and the wide range of possible applications. Thus the present shift securing device can be easily adapted to manual gearboxes having different designs.

REFERENCE CHARACTERS

1 Manual gearbox
2 Input shaft
3 Countershaft
4 Input constant
5 Output shaft
6 Shift rail
7 First shift fork
8 Shift rail
9 Second shift fork
10 Rotational axis
11 First shift rocker
12 Rotational axis
13 Second shift rocker
14 Selector shaft
15 Longitudinal axis
16 Selector finger
17 Selector finger
18 Selector finger
19 Selector finger
20 Rotation
21 Carrier
22 Carrier
23 Carrier
24 Carrier
25 Axial movement
26 Locking body
27 Box frame
28 Transverse member
29 Transverse member
30 Longitudinal member
31 Longitudinal member
32 Bearing hole
33 Bearing hole
34 Bearing bushing
35 Bearing bushing
36 Axial bearing
37 Bearing sleeve
38 Annular groove
39 Rib
40 Intermediate wall
41 Longitudinal slot
42 Locking element
43 Locking element
44 Locking element
45 Locking element 46 Counter locking element
47 Counter locking element
48 Counter locking element
49 Counter locking element
50 Locking rib
51 Locking rib
52 Cantilever
53 Cantilever
54 Recess
55 Radial groove
56 Radial groove
57 Locking fork
58 Locking fork
59 Central section
60 Cantilever
61 Locking tooth
62 Locking tooth
A Detail
G1-G6 Forward gear
R Reverse gear

The invention claimed is:

1. A shift securing device for a multi-speed manual gearbox that is shifted by a selector shaft (14) disposed axially parallel to a plurality of gearbox shafts (2, 3, 5),
the selector shaft being supported so as to be axially movable along and rotatable about a longitudinal axis of the selector shaft and being selectively coupleable to at least one shift fork (7, 9) that is guided on at least one of a shift rail (6, 8) and one shift rocker (11, 13) by an associated shift finger (16, 17, 18, 19),
a locking body (26), which is rigidly locked to a housing in an axial direction and rotatable with the selector shaft (14), locking elements (42, 43, 44, 45) are arranged on the locking body for form-locking either the shift fork (7, 9) or the shift rocker (11, 13) that is not coupled,
the locking body (26) being a box frame (27) having at least two transverse members (28, 29) and two longitudinal members (30, 31),
the locking body having respective bearing holes (32, 33) disposed in the transverse members (28, 29),
the bearing holes accommodating the selector shaft (14) in an axially movable manner,
the locking body being connected to the selector shaft (14) in a rotationally fixed manner by a carrier that engages in one of the longitudinal members (30) in a circumferentially form-locking manner,
the locking body being rigidly locked to the housing by an axial bearing (36) disposed on one of the transverse members (28),
the transverse members (28, 29) and the longitudinal members (30, 31), of the locking body (26), being pressed sheet metal parts and stamped sheet metal parts rigidly connected to one another and the transverse members (28, 29) and the longitudinal members (30, 31) of the locking body (26) being either one of welded to one another or inserted and press fit into each other at ends thereof.

2. The shift securing device according to claim 1, wherein the axial bearing (36) is a bearing sleeve (37) that is fastened to the transverse member (28) coaxially adjacent to the bearing hole (32), and the axial bearing (36) has an outer annular groove (38) into which a rib (39), that is fastened to the housing, engages in an assembled state.

3. The shift securing device according to claim 1, wherein the rotationally rigid connection of the box frame (27) to the selector shaft (14) is formed by the engagement of one of the selector fingers (18) in an axial longitudinal slot (41), which is disposed either in the largely tangentially oriented longitudinal member (30) or in a largely tangentially oriented section of the longitudinal member.

4. The shift securing device according to claim 1, wherein at least one locking element (42, 43), provided for the shift fork (7, 9), is a circumferentially-radially oriented locking rib (50, 51) and an associated counter locking element (46, 47) is a circumferential radial groove (55, 56) that is disposed in the associated shift rail (6, 8), the locking rib (50, 51) engaging the circumferential radial groove when the shift fork (7, 9) is uncoupled.

5. The shift securing device according to claim 4, wherein the at least one locking rib (50, 51) is disposed on a cantilever (52, 53) of one of the transverse members (28) that protrudes radially beyond the adjacent longitudinal member (30, 31).

6. The shift securing device according to claim 1, wherein the at least one locking element (44, 45), provided for the shift rocker (11, 13), is an axially-radially oriented locking fork (57, 58) and an associated counter locking element (48, 49) is a radial locking tooth (61, 62) that is disposed on the associated shift rocker (11, 13) and axially enclosed by the locking fork (57, 58), when the associated shift rocker (11, 13) is uncoupled.

7. The shift securing device according to claim 6, wherein the at least one locking fork (57, 58) is disposed either on the largely radially oriented longitudinal member (31) or on a largely radially oriented section of the longitudinal member.

8. The shift securing device according to claim 6, wherein the at least one locking fork (57, 58) is disposed either in a central section (59) of the longitudinal member (31) lying between the two transverse members (28, 29) or on a cantilever (60) of the longitudinal member (31) axially protruding beyond the adjacent transverse member (29).

* * * * *